United States Patent Office 3,679,363
Patented July 25, 1972

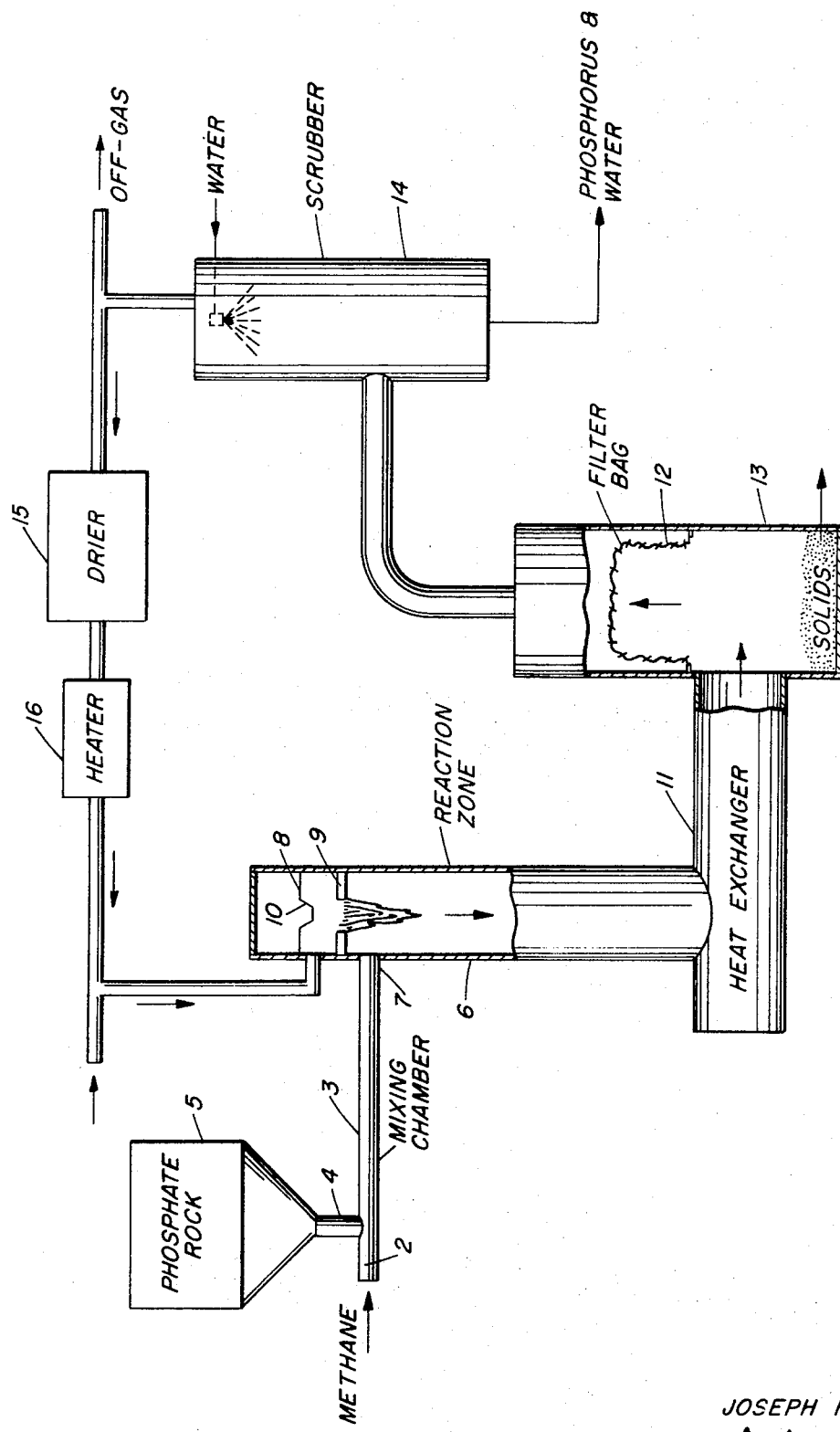

3,679,363
PRODUCTION OF PHOSPHORUS
Joseph Francis Skrivan, Stamford, Conn., assignor to American Cyanamid Company, Stamford, Conn.
Filed Dec. 15, 1970, Ser. No. 98,363
Int. Cl. C01b 25/02
U.S. Cl. 23—223
4 Claims

ABSTRACT OF THE DISCLOSURE

In a continuous process of making phosphorus by reduction of fine particulate phosphate rock while suspended as dilute solid phase in a gas stream which comprises hydrocarbon gas reducing agent, and wherein the phosphate rock and hydrocarbon reactants are heated together in said stream to reaction temperature in a reaction zone by hot plasma gas heated in a plasma generator, the invention provides the improvement wherein said plasma gas consists essentially of hydrogen and carbon monoxide recycled from the reactor product stream after removal of phosphorus and solids from said product stream. Preferred reaction temperatures are about 1600–3400° F. The preferred hydrocarbon is methane. The recycle gas can be preheated prior to final heating in the plasma generator.

The invention relates to improvements in a process for the production of phosphorus from phosphate rock.

The improvement of the present invention relates particularly to a process wherein fine particulate phosphate rock is suspended as a dilute solid phase in a high velocity gas stream which also comprises a hydrocarbon gas such as methane, cyclohexane or the like. The stream is directed into a reaction zone where it is heated by means of a plasma to reaction temperature in the range from about 1600° F. to about 3400° F. The phosphate in the dilute solid phase is reduced by the reducing gas, principally hydrocarbon gas, as the hot stream moves through the reaction zone. The emerging stream of gas and solids is cooled, the solids are separated, then phosphorus is condensed and separated from the gas stream.

The plasma gas previously used has been an argon or hydrogen plasma. It has now been found that the process is operated more economically by recycling a portion of the gas stream after removing solids, phosphorus and water, for use as the plasma gas. After separation of solids and phosphorus, the gas stream from the water scrubber consists mostly of carbon monoxide and hydrogen with some water. It is not difficult to remove the water and with that done, the recycle gas is quite suitable for use as plasma gas. The use of recycle gas permits operation of the process without diluting or contaminating the process gas stream with any material not actually produced in the process. This feature makes the non-recycled portion of the off gas, consisting essentially of hydrogen and carbon monoxide, suitable for use as synthesis gas in other processes, as for example in ammonia or methanol production. The non-recycled portion of the off gas is also more suitable for use as fuel, and because the lack of any inert auxiliary gas such as argon, results in a higher heating value per unit of fuel. Further, recycling avoids the cost of supplying an inert gas for the plasma.

To reduce the electric power requirement the dry gas recycled to the plasma generator may be preheated as by a tube furnace or the like. Optionally, a portion of the off-gas that is not recycled may be burned as fuel for heating the recycle gas.

The plasma jet is produced by a plasma generator designed for heating a mixture of hydrogen and carbon monoxide as the plasma gas.

The plasma jet is directed into a cylindrical reaction zone. Natural gas, which contains methane to be used as the reducing reactant, is fed continuously in a high velocity gas stream through a mixing chamber where finely divided phosphate rock particles are metered into the gas stream. Other hydrocarbons such as naphtha or other petroleum fractions, cyclohexane or the like may be substituted for methane as the reducing agent.

The fine solid particles are suspended as a dilute solid disperse phase in the high velocity gas stream, and transported in the stream directly into the reaction zone at a point near the plasma jet inlet. The gas-solids stream is directed into the very high temperature plasma jet which rapidly mixes with and heats the stream comprising the hydrocarbon and phosphate reactants, up to reaction temperature. The solids, still dispersed in the gas mixture which now consists of the mixed natural gas (and its decomposition products) and the plasma gas, are transported at high velocity through the reaction zone. This zone is of size sufficient to provide adequate residence time for high temperature reduction of the fine particulate phosphate solids by methane in the reaction zone. At the temperatures in the reaction zone the phosphorus product is in its gaseous state and is transported as part of the gas phase of the stream through the reactor. The reactor product stream, consisting of fine particulate solids suspended and entrained in a continuous gas phase, is directed through a cooling chamber where some heat is withdrawn, but temperature of the stream is maintained above the condensation temperature of phosphorus. The partially cooled stream, with solids still in dilute disperse phase is directed to a gas-solids separator such as a filter bag or cyclone separator or the like. It is preferred to keep the temperature of the stream above the condensation temperature of phosphorus until after the solids are separated. After separation of solids, the gas stream is directed to a water spray chamber where the gases are further cooled and phosphorus condenses. Phosphorus is recovered in the aqueous liquid stream from the spray chamber.

The drawing illustrates a laboratory apparatus suitable for carrying out a process in accordance with the invention. The drawing is a diagrammatic sketch of the apparatus. Referring now to the drawing, reference numeral 2 designates a gas inlet port through which a highly velocity gas stream is fed into a mixing chamber 3 which is an alumina tube. Fine particulate phosphate rock solids are metered into the mixing chamber 3 through a solids inlet port 4 from a solids feed container 5. The particulate solids are dispersed as a dilute solid phase in the gas stream as it proceeds through the mixing chamber 3 and enters a reactor 6 through an alumina feed tube 7 leading from the mixing chamber 3 through the reactor wall to a point inside the reactor at which the gas-solids stream is fed directly into a plasma jet. The reactor 6 in this embodiment is a cylindrical tube fabricated of a refractory material. Attached to the reactor 6 is a direct current plasma torch 8 located so that it will direct its generated plasma jet, concentrically, into the reactor 6. The plasma arc generator comprises a metal electrode ring 9 and an electrode rod 10 with its tip located concentrically upstream of the ring 9 in the torch 8. When the electrodes 9 and 10 are charged electrically, an arc is generated between the tip of the rod 10 and the ring 9. Plasma gas fed into the torch 8 at an inlet upstream of the arc is forced through the ring 9 where it is ionized and heated by the arc, and flows therefrom as a plasma jet into the reactor 6. The lower end of the reactor 6 opens into a heat exchanger 11 in which the gas solids reactor effluent stream is partially cooled. The heat exchanger is a steam jacketed tube. The entire apparatus is sealed to exclude air from the gas stream throughout.

The reactor 6 is thermally insulated from the plasma generator at the top of the reactor and from the heat exchanger 10 at the bottom. Both the heat exchanger and the plasma generator having cooling jackets not shown in the drawing.

The outlet of the heat exchanger leads to a filter bag 12 of heat-resistant fabric where solids are separated and collected as they fall into the solids collections box 13. The gases proceed through the filter bag 12 and are fed to a scrubber column 14 where the gases are cooled and phosphorus is condensed in a countercurrent stream of water.

The portion to be recycled of the residue gas emerging from scrubber 14 is led to a drier 15, which in the laboratory apparatus is a column packed with silica gel to remove water by adsorption from the gas stream. In a preferred embodiment of the invention the dry portion of the gas to be used as plasma gas is preheated in a tube furnace to about 1200° F. before being led to the plasma generator. Gas blowers or compressors, not shown in the drawings, may be used in the gas lines where necessary to move the gas as described. Control apparatus such as valves, by-pass lines, etc., not shown in the drawing, are placed where needed. The tube furnace may be fueled with any available fuel and where desired, a portion of the unrecycled gas from the scrubber may be used as fuel for such furnace.

EXAMPLE 1

Using the equipment described above, the plasma generator is started up using an auxiliary synthetic plasma gas mixture comprising about 2 parts of hydrogen and one part carbon monoxide by volume. This gas stream, flowing at a rate of 0.61 lb./hour is heated by the plasma arc to an enthalpy of approximately 12,000 B.t.u./lb. and this stream flows into the reactor into which 2.65 lbs./hour of phosphate rock (containing 13.6% phosphorus as calcium phosphate) are conveyed by a stream of 0.38 lb./hour of natural gas (96% $CH_4$). The rock-natural gas mixture is heated to about 2400° F. as it mixes with the hot plasma. In the reactor, the particulate phosphate rock is reduced by methane to form phosphorus, by-products CO and $H_2$ and a mixture of solids, primarily calcium oxide. The stream temperature is reduced to about 400° F. in the heat exchanger 11 and the solids are separated from the gas by passing the gas through a bag filter. The exit gas from the filter has a composition approximately as follows:

STREAM A

| Constituent: | Percent by volume |
|---|---|
| $H_2$ | 66.9 |
| CO | 30.0 |
| $P_4$ | 1.7 |
| $N_2$ | 1.4 |
| $H_2O$ | Trace |
| $SiF_4$ | Trace |

This gas stream is led to the scrubber 14 where it is scrubbed with water to condense phosphorus, $P_4$ and remove silicon tetrafluoride, $SiF_4$. After this operation, the resulting gas stream has the composition (at 120° F.):

STREAM B

| Constituent: | Percent by volume |
|---|---|
| $H_2$ | 60.3 |
| CO | 27.0 |
| $H_2O$ | 11.5 |
| $N_2$ | 1.2 |

A portion of the gas from the stripper is further cooled and dried on a silica gel bed to remove the major portion of water; the dried gas stream consists of:

STREAM C

| Constituent: | Percent by volume |
|---|---|
| $H_2$ | 68.1 |
| CO | 30.5 |
| $N_2$ | 1.4 |
| $H_2O$ | Trace |

The dry gas is suitable for recycle to the plasma generator as a substitute for the starting synthetic gas mixture. In this example the tube furnace preheater 16 shown in the drawing is not used. After the process has been in operation long neough to achieve a steady state (on this scale, 10 minutes is sufficient), a portion of the recycle gas is gradually admitted to the plasma generator, while simultaneously decreasing the flow of the auxiliary synthetic CO—$H_2$ mixture gradually to zero, at which point the plasma generator is operating entirely on recycled gas from stream C. This continues until the process is shut down.

About one-third of the total gas (stream B) is recycled to the plasma generator. In this particular example, 36% of the gas is recycled as the system is operated continuously at a steady rate.

EXAMPLE 2

The procedure of Example 1 is followed except the recycle plasma gas is preheated in a tube furnace 16 to 1200° F. before introduction to the plasma generator. This reduces the power requirement of the plasma generator by about 4%. On a plant size unit, this method also results in a reduction of capital investment due to the lower power installation required.

I claim:

1. In a continuous process of making phosphorus by reduction of fine particulate phosphate rock while suspended as dilute solid phase in a gas stream which comprises hydrocarbon gas reducing agent, and wherein the phosphate rock and hydrocarbon reactants are heated together in said stream to reaction temperature in a reaction zone by hot plasma gas heated in a plasma generator, the improvement wherein said plasma gas consists essentially of hydrogen and carbon monoxide recycled from the reactor product stream after removal of phosphorus and solids from said product stream.

2. A process defined by claim 1 wherein the reaction temperature in said reaction zone is in the range from 1600 to 3400° F.

3. A process defined by claim 1 wherein the hydrocarbon reducing agent is methane.

4. A process defined in claim 1 wherein said recycled plasma gas is preheated by means of a furnace prior to final heating in a plasma generator.

References Cited

UNITED STATES PATENTS

| 2,168,312 | 8/1939 | Baily | 23—223 X |
| 2,675,307 | 4/1954 | Klugh et al. | 23—223 X |
| 3,404,078 | 10/1968 | Goldberger | 204—164 |
| 3,481,706 | 12/1969 | Veltman et al. | 23—223 |

FOREIGN PATENTS

| 1,004,382 | 9/1965 | Great Britain | 23—223 |

OSCAR R. VERTIZ, Primary Examiner

C. B. RODMAN, Assistant Examiner

U.S. Cl. X.R.

75—10; 204—164